(12) United States Patent
Varnas et al.

(10) Patent No.: US 11,782,293 B2
(45) Date of Patent: Oct. 10, 2023

(54) PROGRESSIVE ADDITION LENS FOR MYOPIA CONTROL AND METHOD OF MANUFACTURING THE SAME

(71) Applicants: Carl Zeiss Vision International GmbH, Aalen (DE); Ray Steven Spratt, Petaluma, CA (US)

(72) Inventors: Saulius Raymond Varnas, Brighton (AU); Ray Steven Spratt, Petaluma, CA (US); Timo Kratzer, Aalen (DE); Gerhard Kelch, Aalen (DE); Siegfried Wahl, Donzdorf (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/159,273

(22) Filed: Jan. 25, 2023

(65) Prior Publication Data

US 2023/0161177 A1 May 25, 2023

Related U.S. Application Data

(63) Continuation of application No. PCT/EP2021/071412, filed on Jul. 30, 2021.

(30) Foreign Application Priority Data

Aug. 7, 2020 (WO) ................ PCT/US2020/045459

(51) Int. Cl.
*G02C 7/06* (2006.01)
*G02C 7/02* (2006.01)

(52) U.S. Cl.
CPC ............ *G02C 7/022* (2013.01); *G02C 7/066* (2013.01); *G02C 2202/24* (2013.01)

(58) Field of Classification Search
CPC ........ G02C 2202/24; G02C 7/00; G02C 7/02; G02C 7/022; G02C 7/066; G02C 7/063; G02C 7/06

(Continued)

(56) References Cited

U.S. PATENT DOCUMENTS 10,268,050 B2 4/2019 To et al.
10,401,648 B2 9/2019 Benoit et al.
(Continued)

FOREIGN PATENT DOCUMENTS

CN 208969368 U 6/2019
WO 2014019968 A1 2/2014
(Continued)

OTHER PUBLICATIONS

Zhu et al., "The potency of myopic defocus in lens-compensation," Invest. Ophthalmol. Vis. Sci., vol. 44, No. 7, pp. 2818 to 2827, Jul. 2003.

(Continued)

*Primary Examiner* — William R Alexander
(74) *Attorney, Agent, or Firm* — Tautz & Schuhmacher LLC; Georg Hasselmann

(57) ABSTRACT

A progressive addition lens contains a plurality of microlenses for providing simultaneous myopic defocus. The microlenses are superimposed on a power variation surface of the lens, which includes a designated distance portion in the upper section of the lens adapted for distance vision and a fitting cross; a designated near portion located in the lower section of the lens, the near portion including a near reference point having a near dioptric power adapted for near vision; and a designated intermediate corridor extending between the designated distance portion and near portions. Microlenses are excluded from all areas of the surface located below a notional line extending from nasal to (Continued)

temporal limits of the lens at a vertical coordinate above the near reference point where the vertical coordinate lies at a distance above the near reference point with the distance being in a range between 1.5 mm and 3 mm.

29 Claims, 6 Drawing Sheets

(58) Field of Classification Search
USPC .................................................. 351/159.42
See application file for complete search history.

(56) References Cited

U.S. PATENT DOCUMENTS

| 2018/0081196 | A1* | 3/2018 | Benoit | G02C 7/066 |
|---|---|---|---|---|
| 2020/0096791 | A1* | 3/2020 | Carmon | G02C 7/066 |
| 2020/0393702 | A1* | 12/2020 | Guillot | G02C 7/022 |

FOREIGN PATENT DOCUMENTS

| WO | 2018100012 A1 | 6/2018 |
|---|---|---|
| WO | 2019166657 A1 | 9/2019 |
| WO | 20191666574 A1 | 9/2019 |
| WO | 2020113212 A1 | 6/2020 |

OTHER PUBLICATIONS

Wallman et al., "Homeostasis of Eye Growth and the Question of Myopia," Neuron, vol. 43, No. 4, pp. 447 to 468, Aug. 2004.
Mutti et al., "Relative Peripheral Refractive Error and the Risk of Onset and Progression of Myopia in Children," Invest. Ophthalmol. Vis. Sci., vol. 52, No. 1, pp. 199 to 205, Jan. 2011.
Sng, "Peripheral Refraction and Refractive Error in Singapore Chinese Children," Invest. Ophthalmol. Vis. Sci., vol. 52, No. 2, pp. 1181 to 1190, Feb. 2011.
Tse et al., "Graded Competing Regional Myopic and Hyperopic Defocus Produce Summated Emmetrapization Set Points in Chick," Invest. Ophthalmol. Vis. Sci., vol. 52, No. 11, pp. 8056 to 8062, Oct. 2011.
Jung et al., "Prevalence of myopia and its association with body stature and educational level in 19-year-old male conscripts in Seoul, South Korea," Invest. Ophthalmol. Vis. Sci., vol. 53, No. 9, pp. 5579 to 5583, Aug. 2012.
Lam et al., "Defocus Incorporated Soft Contact (DISC) lens slows myopia progression in Hong Kong Chinese schoolchildren: a 2-year randomised clinical trial," Br J Ophthalmol, vol. 98, No. 1, pp. 40 to 45, Jan. 2014.
Hasebe et al., "Myopia control with positively aspherized progressive addition lenses: a 2-year, multicentre, randomized, controlled trial," Invest. Ophthalmol. Vis. Sci., vol. 55, No. 11, pp. 7177 to 7188, Nov. 2014.
Wong et al., "Epidemiology and disease burden of pathologic myopia and myopic choroidal neovascularization: an evidence-based systematic review," Am J Ophthalmol; 157: 9-25; 2014.
Atchison et al., "Relative peripheral hyperopia does not predict development and progression of myopia in children," Invest. Ophthalmol. Vis. Sci., vol. 56, No. 10, pp. 6162 to 6170, Sep. 2015.
Walline, "Myopia Control: A Review. Eye & Contact Lens," vol. 42, No. 1, 3 to 8, Jan. 2016.
Holden et al., "Global Prevalence of Myopia and High Myopia and Temporal Trends from 2000 through 2050", Ophthalmology, vol. 123, No. 5, pp. 1036 to 1042, May 2016.
Cheng et al., "Soft Contact Lenses with Positive Spherical Aberration for Myopia Control," Optom Vis Sci; 93: 353 to 366; 2016.
Aller et al., "Myopia Control with Bifocal Contact Lenses: A Randomized Clinical Trial," Optom Vis Sci; 93: 344 to 352; 2016.
Gong et al., "Accommodation and Phoria in Children Wearing Multifocal Contact Lenses," Optom Vis Sci., vol. 94, No. 3, pp. 353 to 360, Mar. 2017.
Ruiz-Pomeda et al., "MiSight Assessment Study Spain (Mass). A 2-year randomized clinical trial," Graefe's Archive for Clinical and Experimental Ophthalmology, vol. 256, No. 5, pp. 1011 to 1021, Feb. 2018.
Yuan et al., "Fabrication of Microlens Array and Its Application: A Review," Chinese Journal of Mechanical Engineering, vol. 31, pp. 1 to 9, Feb. 2018.
Sankaridurg et al., "Myopia control with novel central and peripheral plus contact lenses and extended depth of focus contact lenses: 2 year results from a randomised clinical trial," Ophthalmic Physiol Optics, vol. 39, No. 4, pp. 294 to 307, Jul. 2019.
Chamberlain et al., "A 3-year Randomized Clinical Trial of MiSight Lenses for Myopia Control," Optom Vis Sci., vol. 96, No. 8, pp. 556 to 567, Aug. 2019.
Lam et al., "Defocus incorporated multiple segments (DIMS) spectacle lenses slow myopia progression: A 2-year randomised clinical trial," British Journal of Ophthalmology, vol. 104, No. 3, pp. 363 to 368, 2020.
Industrial Norm DIN EN ISO 8980-2:2017-12, "Ophthalmic optics—Uncut finished spectacle lenses, Part 2 Specifications for power-variation lenses," third edition, in English, 2017.
Industrial Norm "Ophthalmic optics—Spectacle lenses—Vocabulary (ISO 13666:2019)," German and English version EN ISO 13666:2019, Dec. 2019.
International Search Report and Written Opinion issued in International Application No. PCT/US2020/045459, to which this application claims priority, dated May 14, 2021.
International Search Report and Written Optinion issued in International Application No. PCT/EP2021/ 071412, to which this application claims priority, dated Sep. 11, 2021.
International Preliminary Report on Patentability issued in International Application No. PCT/EP2021/ 071412, to which this application claims priority, dated Oct. 21, 2022.
Office Action by the European Patent Office (EPO) issued in EP 21 752 536.9, which is a counterpart hereof, dated Jul. 5, 2023 (in English).

* cited by examiner

PROGRESSIVE ADDITION LENS FOR MYOPIA CONTROL AND METHOD OF MANUFACTURING THE SAME

CROSS REFERENCE TO RELATED APPLICATIONS

This application is a continuation application of international patent application PCT/EP2021/071412, filed on Jul. 30, 2021, designating the U.S. and claiming priority to international patent application PCT/US2020/045459, filed on Aug. 7, 2020, both of which are hereby incorporated by reference in their entireties.

TECHNICAL FIELD

The present disclosure relates to a progressive addition lens and a method of manufacturing a progressive addition lens. In addition, the disclosure relates to a computer program for establishing a numerical representation of a progressive addition lens, a non-volatile computer readable storage medium with such a computer program, a data processing system for establishing a numerical representation of a progressive addition lens and a computer implemented method of establishing a numerical representation of a progressive addition lens.

BACKGROUND

In many East Asian countries myopia has reached epidemic proportions with some large urban centers reporting close to 100% incidence of myopia among 18-19 year olds (Jung S-K, Lee JH, Kakizaki H, et al. Prevalence of myopia and its association with body stature and educational level in 19-year-old male conscripts in Seoul, South Korea. Invest Ophthalmol Vis Sci. 2012; 53: 5579-5583.). It has been estimated that there have been around 2 billion myopes worldwide in 2010 and some of the recent epidemiological modelling suggests that this figure will increase to 5 billion in 2050 (Holden, BA, Fricke, TR, Wilson, DA et al. Global Prevalence of Myopia and High Myopia and Temporal Trends from 2000 through 2050. Ophthalmology 2016, 123: 1036-1042). Furthermore, there is an increasing trend for juveniles to develop high myopia (defined as SER <−5.00 D where SER stands for Spherical Equivalent Refraction), which substantially increased risk of eye diseases like cataract, glaucoma, retinal detachment and myopic maculopathy, all of which can cause irreversible vision loss (Wong TY, Ferreira A, Hughes R, et al. Epidemiology and disease burden of pathologic myopia and myopic choroidal neovascularization: an evidence-based systematic review. Am J Ophthalmol 2014; 157: 9-25). Epidemiological models predict a global increase of high myopia from around 300 million in 2010 to 1 billion in 2050 (Holden et al. 2016). This will inevitably lead to a very high cost to society in treating visual impairment and lost productivity.

Bi-focal and progressive addition lenses have been trialled clinically with the aim of reducing accommodative lag during near vision tasks which is thought to be one of the main causes of juvenile myopia progression that usually coincides with the beginning of schooling. A recent Bayesian meta-analysis of progressive addition lens clinical trials to control juvenile progression of myopia has shown that PALs (Progressive Addition Lenses) are moderately effective in slowing down progression of myopia in the first year with the mean retardation of myopia in 10 randomized clinical trials (RCTs) of PALs being 28% but the effect weakens to 20% after 24 months and drops to just 15% after 36 months (Varnas, Gu & Metcalfe (2020), in preparation). There is a need to augment PAL designs to enhance their efficacy in retarding progression of myopia and to overcome the weakening of its efficacy over time.

There are reports of apparent successes in controlling the progression of myopia in RCTs with bi-focal contact lenses providing simultaneous myopic defocus on the fovea (Lam CS, Tang WC, Tse DY et al. Defocus Incorporated Soft Contact (DISC) lens slows myopia progression in Hong Kong Chinese schoolchildren: a 2-year randomized clinical trial. Br J Ophthalmol 2014; 98: 40-45; Cheng X, Xu J, Chehab K, et al., Soft Contact Lenses with Positive Spherical Aberration for Myopia Control, Optom Vis Sci 2016; 93: 353-366; Aller TA, Liu M & Wildsoet CF, Myopia Control with Bifocal Contact Lenses: A Randomized Clinical Trial, Optom Vis Sci 2016; 93: 344-352.; Ruiz-Pomeda, A., Perez-Sanchez, B. Valls, I., Prieto-Garrido FL, Gutierrez-Ortega R, Villa-Collar C. MiSight Assessment Study Spain (MASS): A 2-year randomized clinical trial, Graefe's Archive for Clinical and Experimental Ophthalmology 256, 1011-1021, 2018; Sankaridurg P, Bakaraju RC, Naduvilath T, Chen X, Weng R, Tilia D, Xu P, Li W, Conrad F, Smith EL III & Ehrmann K. Myopia control with novel central and peripheral plus contact lenses and extended depth of focus contact lenses: 2 year results from a randomized clinical trial. Ophthalmic Physiol Opt 2019; 39(4):294-307, Chamberlain P, Peixoto-De-Matos SC, Logan NS, Ngo C, Jones D, Young G. A 3-year Randomized Clinical Trial of MiSight Lenses for Myopia Control. Optom Vis Sci. 2019;96(8):556-67). Most of these studies used center-distance design contact lenses and it has been hypothesized that they provide a stop signal for the eye growth through their effect on peripheral vision which tends to exhibit a relative hyperopic shift in myopic eyes (e.g., Walline, JJ. Myopia Control: A Review. Eye & Contact Lens. Volume 42, Number 1, January 2016, 3-8). However, this theory is contradicted by the outcomes of a range of clinical studies showing that there is very little correlation between the rate of progression of myopia and peripheral hyperopic shift (Mutti, D.O., Sinnott, L.T., Mitchell, G.L., Jones-Jordan, L.A., Moeschberger, M.L., Cotter, S.A., Kleinstein, R.N., Manny, R.E., Twelker, J.D., Zadnik, K. (2011). Relative Peripheral Refractive Error and the Risk of Onset and Progression of Myopia in Children, Invest. Ophthalmol. Vis. Sci., 52(1), 199-205; Sng, C.C.A., Lin, X.-Y., Gazzard, G., Chang, B., Dirani, M., Chia, A., Selvaraj, P., Ian, K., Drobe, B., Wong, T.-Y. & Saw, S.-M. (2011). Peripheral Refraction and Refractive Error in Singapore Chinese Children, Invest. Ophthalmol. Vis. Sci., 52(2), 1181-1190; Hasebe S, Jun J, Varnas SR. Myopia control with positively aspherized progressive addition lenses: a 2-year, multicenter, randomized, controlled trial. Invest Ophthalmol Vis Sci. 2014; 55: 7177-7188). Furthermore, in the large-scale study involving 2700 Chinese children (Atchison, D.A., Li, S.-M., Li, H., Li, S.-Y., Liu, L.-R., Kang, M.-T., Meng, B., Sun, Y.-Y., Zhan, S.-Y., Mitchell, P. and Wang, N. Relative peripheral hyperopia does not predict development and progression of myopia in children. Invest Ophthalmol Vis Sci.; 2015; 56: 6162-6170)—there were the opposite correlations—children with more hyperopic relative peripheral refraction (RPR) progressed in myopia less than those with less hyperopic RPR. Therefore, the inventors hypothesize that the efficacy of bifocal contact lenses in retarding axial elongation of the eyeball in myopic children depends on the delivery of simultaneous myopic defocus on the fovea, not the peripheral retina.

The difficulty is how to deliver such simultaneous myopic defocus in spectacle lenses in a way that will not affect the young patients' acceptance of such lenses. A conceptual solution to this problem was proposed in the U.S. 0,268,050 B2 by applying an annular or circular array of microlenses to the surface of a spherical spectacle lens. With the annular array of microlenses a small area centered on the optical center of the spectacle lens and having about two pupil diameters is left clear of the microlenses to increase wearer comfort and help with acceptance. Similar spectacle lenses with microlenses are disclosed in WO 2019/166657 A1.

WO 2019/166654 A1 discloses a spectacle lens with an annular array of microlenses centered on the optical center of the spectacle lens where the central part of the spectacle lens is left clear of the microlenses. The spectacle lens disclosed in WO 2019/166654 A1 may be implemented as a progressive addition lens. The use of progressive addition lenses for reducing accommodative lag is, for example, known from WO 2018/100012 A1 which discloses a special progressive addition lens with a high negative mean power gradient around the near portion for reducing accommodative lag.

WO 2020/113212 A1 discloses a spectacle lens with scattering centers and two clear apertures being free of scattering centers. The scattering centers may be protuberances on a surface of the spectacle lens having dimensions in the range from 0.001 mm to 1 mm, and the spectacle lens may be a progressive addition lens with one of the clear apertures being located in the near portion. The spectacle lens may also include microlenses where the microlenses form an annular array and are not present in the clear apertures. One of the clear apertures is then located at the center of the array while the other may be located in the near portion where it forms a discontinuity in the annular array. However, still some areas of the near portion are covered by microlenses in WO 2020/113212 A1. An evaluation of spectacle lenses with an annular array of microlenses leaving a small area centered on the optical center of the spectacle lens clear which has been performed by the inventors of the present disclosure indicates that such spectacle lenses may create discomfort and eye strain when viewing near objects foveally through the microlenses. In addition, the clear aperture in the near portion overlaps with the peripheral zone of the progressive spectacle lens which would make it difficult to use the concept of WO 2020/113212 A1 with progressive addition lenses having a high negative mean power gradient around the near portion, as they are disclosed in WO 2018/100012 A1, because the near portion of those progressive addition lenses is typically more narrow than that of a usual progressive addition lens.

SUMMARY

In the light of WO 2019/166654 A1 it is a first objective of the present disclosure to provide a progressive addition lens with simultaneous myopic defocus providing microlenses which helps to avoid discomfort and eye strain and which can easily be combined with a high negative mean power gradient around the near portion.

It is a second objective of the present disclosure to provide a method of manufacturing a progressive addition lens with simultaneous myopic defocus providing microlenses which helps to avoid discomfort and eye strain and which can easily be combined with a high negative mean power gradient around the near portion.

It is a third objective of the present disclosure to provide a data processing system and computer program for, as well as a computer implemented method of, establishing a numerical representation of a progressive addition lens with simultaneous myopic defocus providing microlenses which helps to avoid discomfort and eye strain and which can easily be combined with a high negative mean power gradient around the near portion.

The objectives are achieved by a progressive addition lens wherein microlenses are excluded from all areas of the surface which are located below a notional line, as disclosed herein. A method of manufacturing such a progressive addition lens, a computer program computer program for establishing a numerical representation of such a progressive addition lens, a non-volatile storage medium for storing the computer program, a data processing system for establishing a numerical representation of such a progressive addition lens, and a computer implemented method of establishing a numerical representation of a progressive addition lens are disclosed below, as well as exemplary embodiments of the disclosure.

The following definitions are used within the scope of the present description:

Progressive Addition Lens

A progressive addition lens (PAL), which is sometimes also called progressive power lens (PPL) or varifocal lens, is a power variation lens, i.e., a spectacle lens with a smooth variation of focal power over part or all of its area, without discontinuity. It is designed to provide more than one focal power with two reference points for focal power, generally designed to provide correction for presbyopia and clear vision from distance to near (DIN ISO 13666:2019, section 3.7.8).

Distance Portion

The distance portion refers to that portion of a progressive addition lens which has the dioptric power for distance vision (DIN ISO 13666:2019, section 3.15.1). Throughout this specification the dioptric power for distance vision is called distance dioptric power.

Distance Reference Point

The distance reference point is a point on the front surface of a spectacle lens at which the verification power for the distance portion applies (DIN ISO 13666:2019, section 3.2.20), where the verification power is the dioptric power of the spectacle lens that is specifically calculated and provided by the manufacturer as the reference for focimeter verification.

Near Portion

The near portion refers to that portion of a progressive addition lens which has the dioptric power for near vision (DIN ISO 13666:2019, section 3.15.3).

Near Reference Point

The near reference point is a point on the front surface of a spectacle lens at which the verification power for the near portion applies (DIN ISO 13666:2019, section 3.2.21), where the verification power is the dioptric power of the spectacle lens that is specifically calculated and provided by the manufacturer as the reference for focimeter verification.

Intermediate Corridor

The term "intermediate corridor" shall designate a portion of a power-variation lens, like a progressive addition lens, providing the intended change in spherical and cylindrical vertex powers. Hence, in the context of the present disclosure, the term "intermediate corridor" denotes a zone in the progressive addition lens having low surface astigmatism and a surface power varying from that of the distance vision portion to that of the near vision portion.

Addition Power

The addition power specifies the difference between the vertex power of the near portion of progressive addition lens and the vertex power of the distance portion of the progressive addition lens (DIN ISO 13666:2019, section 3.16.3) with the vertex power representing the reciprocal of the paraxial back focus of the image-side focus, measured in meters.

Dioptric Power

The term "dioptric power" forms a collective term for the focal power and the prismatic power of a spectacle lens. The term "focal power" in turn forms a collective term for the spherical vertex power, which brings a paraxial pencil of parallel light to a single focus (and which is usually considered in the prescription by the "sphere" value or, abbreviated, "sph," and the cylindrical vertex power of a spectacle lens, which brings a paraxial pencil of parallel light to two separate line foci mutually at right angles (DIN ISO 13666:2019, section 3.10.2) and which is usually considered in the prescription by the "cylinder" value or, abbreviated, "cyl." The "vertex power" is the reciprocal of the paraxial vertex focal length (DIN ISO 13666:2019, section 3.10.7). Within the scope of the present description, a beam is to be considered to be a paraxial pencil of rays if its diameter does not exceed 0.05 mm, in particular 0.01 mm.

Power Variation Surface

A power variation surface is a surface with a smooth variation of surface power over part or all of its area, without discontinuity (DIN ISO 13666:2019, section 3.4.10) where the surface power is the local ability of a finished surface to change the vergence of a pencil of rays incident at the surface (DIN ISO 13666:2019, section 3.10.4). In case of a progressive addition lens the power variation surface may also be called "progressive surface."

As-Worn Position

The as-worn position is the position, including orientation, of the spectacle lenses relative to the eyes and face during wear (DIN ISO 13666:2019, section 3.2.36).

Numerical Representation of a Spectacle Lens

Within the meaning of the present disclosure, a numerical representation of a spectacle lens is a mathematical description of the spectacle lens for the purposes of carrying out an optimization by means of a computer-implemented method and for the purposes of producing a spectacle lens by means of a CNC process.

Optimizing a Spectacle Lens

Within the scope of the present disclosure, optimizing a spectacle lens means carrying out a computer-assisted process, in which the numerical representation of a spectacle lens is described with the aid of at least one parameterized function describing the numerical representation, typically with the aid of a plurality of parameterized functions, in which a target property to be achieved by the spectacle lens is predetermined and in which a merit function is specified, the value(s) of which specifying a deviation of the property achieved by the current parameter value(s) of the parameterized function(s) from the target property, with the parameter value(s) of the parameterized function(s) being varied until the value(s) of the target function satisfies or satisfy a termination criterion that leads to the termination of the variation of the parameter value or of the parameter values.

Prescription

The term "prescription" denotes a summary in which the dioptric powers necessary for correcting a diagnosed refractive error are specified in the form of suitable values. In the case of spherical power, the prescription may contain a value "sph" for sphere. In the case of astigmatic power, the prescription can contain values "cyl" for cylinder and "axis" for axis, and, in the case of prismatic power, the prescription can contain a prism value. Moreover, the prescription may contain further values, for example the "add" value in the case of multifocal spectacle lenses, the "add" value specifying the difference between the vertex power in the near portion of the spectacle lens and in the distance portion of the spectacle lens. A value "PD" for the interpupillary distance may also be contained in the prescription.

Target Design

A target design within the meaning of the present disclosure is the specification of a distribution of image aberrations over the spectacle lens or of surface properties of the spectacle lens, which should be achieved in an optimization process. In the first case, reference is made to an optical target design and reference is made to a surface target design in the second case. Accordingly, an optical target design is the specification of a distribution of image aberrations over the entire spectacle lens or else, there beyond, in the spectacle wearer beam path (e.g., astigmatic residual deviation, spherical residual deviation, prism, horizontal symmetry, distortion, or else higher order aberrations such as, e.g., coma). Additionally, the optical target design may contain specifications for the astigmatic and spherical residual deviations at reference points (e.g., distance design reference point or near design reference point) or the addition in the measurement beam path of a measuring device, e.g., in the beam path of a vertex power measuring device. By contrast, a surface target design specifies surface properties of the free-form surface to be formed that should be achieved in the optimization process, for example a surface power, a surface astigmatism and an axis of astigmatism. Here, the surface power is a measure of the ability of a surface section surrounding an optimization point to change the vergence (refractive index of the spectacle lens material divided by the radius of curvature of the wavefront) of a beam incident on the surface section from the air. The surface astigmatism at an optimization point represents the difference of the surface powers in the principal meridians at an optimization point of the surface. Provided the text below does not specifically refer to an optical target design or a surface target design but only to a target design, the term "target design" should always comprise both types of target design.

RMS Blur

In the context of the present specification the RMS blur shall be considered to be the physiological blur a wearer of the progressive addition lens experiences due to squared mean spherical error (SphErr) and the squared mean astigmatic error (AstErr) added together with appropriate weights A, B to reflect to way the human vision integrates such optical errors RMS=Sqrt($(A \cdot SphErr^2)+(B \cdot AstErr)^2$). The values of the weights A, B may each lie in the range from 0 to 1, in particular from ½ to 1. One example for calculating the RMS blur is RMS=Sqrt($SphErr^2+(AstErr/2)^2$) with the weights A and being 1 and ½, respectively. The RMS blur is calculated based on ray tracing a model lens using an assumed object field of the ray trace. In addition, for the calculation of RMS blur it is assumed the wearer could accommodate up to 1.00 D of power error.

Microlens

In the context of the present disclosure, the term microlens refers to a small convex structure in the approximately spherical shape of a lens that is provided on a surface of a spectacle lens and has lateral dimensions that are at least by an order of magnitude smaller than the dimensions of the spectacle lens itself.

Fitting Cross

The fitting cross indicates the fitting point of a spectacle lens, i.e., the point on the front surface of a spectacle lens or blank stipulated by the manufacturer for positioning the spectacle lens in front of the eye (DIN ISO 13666:2019, section 3.2.24).

Elliptical Microlens

In the context of the present disclosure, the term "elliptical microlens" refers to the outline of the microlens on the surface on which it is superimposed. Although the microlenses are sections of a sphere, a microlens is called elliptical if its outline on the surface is elliptical. The adjective "elliptical" is used to characterize an outline which fulfils in Cartesian coordinates the following equation $x^2/a^2 + y^2/b^2 = 1$ where a, b, c>1 with the case a=b not being excluded. The case a=b leads to a circle, which is, in the context of the present disclosure, regarded as a special case of an ellipse. Hence, a microlens with a circular outline is regarded to be a special case of an elliptical microlens.

Working Spectacle Lens

The term "working spectacle lens" is used to indicate a spectacle lens given in a form of a numerical representation with at least one parameterized surface that is to be optimized in an optimization process.

Superimposing

In the context of the present disclosure, the term "superimposing" means to impose, place, or set over, above, or on something else.

According to a first aspect of the disclosure, a progressive addition lens with simultaneous myopic defocus providing microlenses is defined. The progressive addition lens has a power variation surface. The power variation surface provides at least a designated distance portion located in an upper section of the progressive addition lens adapted to distance vision, a designated near portion in a lower section of the progressive addition lens where the near portion includes a near reference point having a near dioptric power adapted to near vision, and a designated intermediate corridor extending between the designated distance portion and the designated near portion. The near reference point may define the apex of the near portion and delimit this portion in a vertical direction. A number of microlenses is superimposed on a surface of the progressive addition lens. According to the disclosure, microlenses are excluded from all areas of the surface which are located below a notional line that extends from nasal to temporal limits of the progressive addition lens at a vertical coordinate above the near reference point, where the value of the coordinate lies in a range between 1.5 mm and 3 mm. In many cases a value between 1.8 mm and 2.2 mm is appropriate, for example a value of 2 mm.

Excluding microlenses from the lower section of the progressive addition lens serves a dual purpose: (1) it facilitates compliance with the intended use of the near portion for near vision, and (2) it maintains the beneficial effect of the negative aspherisation of the near portion to reduce accommodative lag.

Array of Microlenses

An array of microlenses is a systematic arrangement of microlenses over an area which is called array area in the context of the present specification. The systematic arrangement may, for example, be realized by a regular or uniform distribution of the microlenses over the array area.

The present disclosure is based on the following considerations:

A spectacle lens design with an annular array of microlenses was successfully tested in a clinical trial at the Hong Kong Polytechnic University (HKPolyU) on approximately 80 children with the similar number of controls showing 52% retardation of progression of myopia and 62% retardation of axial elongation of the eyeball compared to controls after 24 months follow-up with <15% drop-out rate (Lam CSY, Tang WC, Tse DYY, Lee RPK, Chun RKM, Hasegawa K, et al. Defocus incorporated multiple segments (DIMS) spectacle lenses slow myopia progression: A 2-year randomized clinical trial. Br J Ophthalmol. 2020;104(3): 363-8). Tests of this kind of spectacle lenses have revealed that it is far from comfortable to wear over longer periods of time and there is a strong incentive to always look through the central area of the spectacle lens which is clear of the microlenses. This implies that this area of the spectacle lens is being used for central distance vision and for near vision most of the time, and the simultaneous myopic defocus is delivered to the fovea only intermittently when the eye wanders into the area covered by microlenses. This should not be a problem, as it is well known that myopic defocus is much more powerful than the hyperopic defocus in terms of temporal integration and its effect on the evolution of the eye length (Wallman J and Winawer J. Homeostasis of Eye Growth and the Question of Myopia. Neuron 2004; 43: 447-468). It has been shown in animal experiments that the all-day wearing of negative lenses providing hyperopic defocus can be negated by four 2-minute episodes of positive spectacle lens wear (myopic defocus) during the day (Zhu, X., Winawer, J., and Wallman, J. (2003). The potency of myopic defocus in lens-compensation. Invest. Ophthalmol. Vis. Sci. 44,2818-2827). This suggests that intermittent exposure to simultaneous myopic defocus may be sufficient to provide a stop signal for the axial elongation of the eyeball.

In the progressive addition lens disclosed in WO 2019/166654 A1 the annular array of microlenses is also present in the near portion. Since the microlenses provide a positive addition power over and above that at the near reference point (NRP), the presence of the microlenses is likely to reduce the accommodative response, as has been shown in studies of accommodation with bifocal contact lenses (Gong CR, Troilo, D and Richdale K. Accommodation and Phoria in Children Wearing Multifocal Contact Lenses. Optom Vis Sci 2017; 94: 353-360). Therefore, the instant inventors conclude that microlenses should be excluded from the lower portion of the progressive lens dedicated to near vision to maintain the positive effect of addition power on accommodative response. Moreover, the microlenses create multiple images on the fovea due to the variation of prism between the microlenses. Therefore, for the near tasks, when viewing through the area covered by microlenses, one needs to accommodate and focus on the image coming from the surface areas between the microlenses which provide a stable single image. In this scenario the myopic eye will often experience both eye strain and increased accommodative lag due to the presence of myopic defocus providing microlenses in the central field of vision. Although there is a clear aperture which is free of microlenses in the near portion of WO 2020/113212 A1, still some areas of the near portion, especially in the periphery, are covered by microlenses having the relatively positive power that will provide a stimulus to relax accommodation and consequently increase the accommodative lag in the image created by the gaps between the microlenses.

With all areas below a notional line that extends from nasal to temporal limits of the progressive addition lens at a vertical coordinate above the near reference point where the vertical coordinate lies at a distance chosen from the range between 1.5 mm and 3 mm, in particular with a value of about 2 mm, above the near reference point of the inventive progressive addition lens, it can be assured that no microlenses are used during near vision tasks. This results from the fact that the 2 mm approximately corresponds to the radius of the pupil above the near reference point. Therefore, the whole near portion and the adjoining areas which may be used during near vision tasks are free of microlenses, while microlenses are still present in other parts of the progressive addition lens, so that the progressive addition lens can deliver simultaneous myopic defocus for other vision tasks. As a consequence, compared to the progressive addition lenses disclosed in WO 2019/166654 A1 and WO 2020/113212 A1 the inventive progressive addition lens is more comfortable but still effective in delivering myopic defocus and is more effective in reducing accommodative lag.

In the inventive progressive addition lens, to the left and to the right of the designated near portion there may be peripheral zones in which the mean addition power does not exceed 0.125 D. The separation between peripheral zones to the left and to the right of the near portion is then 25 mm or less, in particular 20 mm or less. This provides large gradients of the mean addition power in the areas adjoining the near portion to the left and to the right. Such large gradients are particularly effective in reducing accommodative lag.

In an exemplary embodiment of the disclosure, in those portions of the progressive addition lens, from which microlenses are not excluded, the microlenses are present in zones of the surface in which the RMS (Root Mean Square) blur exceeds a threshold of 0.25 D. These zones can be covered with microlenses without causing significant disruption to foveal vision. This area on the outside may be limited by a circle having the diameter of about 35 mm which corresponds approximately to the largest eye rotation that can be comfortably sustained for a perceptible length of time, and in the lower section of the progressive addition lens it is limited by the vertical coordinate that lies about the radius of the pupil above the near reference point of the progressive addition lens.

The power variation surface may typically provide a designated distance portion located in an upper section of the progressive addition lens. The distance portion is suitable for distance vision and includes a distance reference point having a distance dioptric power. Then, the near dioptric power at the near reference point is given by the distance dioptric power plus a first addition power, and each microlens provides a second addition power at least as high as and typically higher than the first addition power. Typically, the first addition power is 1.50 or higher. If the first addition power is, for example, 1.50 D then the second addition power is 1.50 D or higher, and if the if the first addition power is 2.00 D then the second addition power is 2.00 D or higher. Typically, the second addition power is at least 0.5 D higher than the first addition power. Then, in the example in which the first addition power is 1.50 D the second addition power would be 2.00 D or higher and in the example in which the first addition power is 2.00 D the second addition power would be 2.50 D or higher. The second addition power may, however, be even at least 1.0 D higher than the first addition power. By having the second addition power higher than the first addition power the myopic defocus can be assured.

Typically, a fitting cross is provided on the progressive addition lens. It is advantageous to have the microlenses distributed over an area of the distance portion which extends over a semi-annulus with a smaller radius between 4 and 6 mm and a larger radius between 17 mm and 18 mm, where the semi-annulus is centered on the fitting cross (FC). The outer radius corresponds approximately to the largest eye rotation that can be comfortably sustained for a perceptible length of time. Therefore, providing microlenses outside the outer radius would not be of much use. In addition, the inner radius of 5 mm allows for clear foveal distance vision. Additionally, the microlenses need to be excluded from the inside of the distance power measurement circle which is centered on the distance reference point and has a radius of 4 mm.

The distance reference point in a progressive lens is usually placed between 2 and 6 mm above the fitting cross. In this embodiment of the inventive progressive addition lens the microlenses are located in an area of the distance portion in which they are effective in providing a myopic defocus.

In the inventive progressive addition lens the microlenses superimposed on the surface may form a microlens array covering an array area on the surface, where the fraction of the array area which is covered by microlenses is at least 30%. A coverage of approximately 33% has provided a sufficient stop signal preventing the development of myopia in an animal experiment with chicks, the eyes of which were subjected to competing myopic and hyperopic defocus having the corresponding spatial ratio of the defocus areas 33:67 (Tse, DY and To, C-H, Graded Competing Regional Myopic and Hyperopic Defocus Produce Summated Emmetropization Set Points in Chick, Invest Ophthalmol Vis Sci. 2011; 52:8056-8062). Nevertheless, the coverage may be higher, for example at least 40% or at least 50%.

In an exemplary embodiment of the disclosure, the microlenses superimposed on the surface form a microlens array in which each microlens that is not located at the edge of the array has at least four neighbors, the distance between the centers of neighboring microlenses lies in the range between 1.3 mm and 2.0 mm, and each microlens is elliptical with the arithmetic mean of the semi-major axis and the semi-minor axis being in the range between 0.25 mm and 0.75 mm, in particular in the rage between 0.4 mm and 0.65 mm. It should be noted that the semi-major axis and the semi-minor axis may be identical so that in the present specification the term "elliptical microlenses" shall also include circular microlenses as a limit case. Such a microlens array allows for an area coverage ratio, i.e., fraction of the array area which is covered by microlenses, between 30% and 60%, which is effective in providing myopic defocus, while at the same time keeping the discomfort to the wearer within tolerable limits.

In the inventive progressive addition lens it is advantageous if the surface on which the microlenses are superimposed is the power variation surface. Providing the microlenses on the other surface would make them astigmatic over the peripheral areas of the progressive addition lens. Astigmatic imaging of the microlenses would not provide a clear myopic defocus to the eye. In fact, it may provide a conflicting focal image depending on the orientation of the viewed objects.

According to a second aspect of the disclosure, a method of manufacturing a progressive addition lens with simultaneous myopic defocus providing microlenses is defined. The method includes at least the steps of:

Providing a progressive addition lens with a power variation surface, in which the power variation surface provides at least a designated distance portion located in an upper section of the progressive addition lens adapted to distance vision, a designated near portion located in a lower section of the progressive addition lens, the near portion including a near reference point having a near dioptric power adapted to near vision, and a designated intermediate corridor extending between the designated distance portion and the designated near portion. The near reference point may define the apex of the near portion and delimit this portion in vertical direction.

Superimposing a number of microlenses (13) on a surface of the progressive addition lens.

According to the disclosure, when superimposing the microlenses, a superimposition of microlenses is excluded from all areas of the surface which are located below a notional line that extends from nasal to temporal limits of the progressive addition lens at a vertical coordinate above the near reference point where the vertical coordinate lies in a range between 1.5 mm and 3 mm above the near reference point. In many cases a distance of the vertical coordinate in the range between 1.8 mm and 2.2 mm is appropriate, for example a distance of 2 mm.

The inventive method allows for manufacturing a progressive addition lens that realizes the advantages described with respect to the inventive progressive addition lens.

The power variation surface may have peripheral zones to the left and to the right of the designated near portion in which the mean addition power does not exceed 0.125 D and with a separation between the peripheral zones to the left and to the right of the near portion of 25 mm or less, in particular 20 mm or less, may be provided. This provides large gradients of the mean addition power in the areas adjoining the near portion to the left and to the right. Such large gradients are particularly effective in reducing accommodative lag.

The number of microlenses may be superimposed such that in those portions of the progressive addition lens from which microlenses are not excluded the microlenses are present in zones of the surface in which the RMS blur exceeds a threshold of 0.25 D. These zones can be covered with microlenses without causing significant disruption to foveal vision. This area on the outside may be limited by a circle having the diameter of 35 mm corresponding approximately to the largest eye rotation that can be comfortably sustained for a perceptible length of time, and in the lower section of the progressive addition lens it is limited by the vertical coordinate above the near reference point of the progressive addition lens where the distance of the vertical coordinate from the near reference point is equal to about the radius of the pupil.

The near dioptric power at the near reference point may be given by the distance dioptric power plus the first addition power, and each of the superimposed microlenses provides a second addition power at least as high as and typically higher than the first addition power. Typically, the first addition power is 1.50 or higher. If the first addition power is, for example, 1.50 D, then the second addition power is 1.50 D or higher, and if the first addition power is 2.00 D, then the second addition power is 2.00 D or higher. Typically, the second addition power is at least 0.5 D higher than the first addition power and may be at least 1.0 D higher than the first addition power. Then, in the example in which the first addition power is 1.50 D the second addition power would be 2.00 D or higher and in the example in which the first addition power is 2.00 D the second addition power would be 2.50 D or higher. By having the second addition power higher than the first addition power the myopic defocus can be assured. The second addition power may be the same for each of the microlenses or may vary between the microlenses, as long as the second addition power is at least as high as the first addition power.

In the inventive method, a fitting cross may be provided on the progressive addition lens. The microlenses may then be distributed over an area of the distance portion which forms a semi-annulus with a smaller radius between 4 and 6 mm and a larger radius between 17 mm and 18 mm and centered on the fitting cross (FC). The outer radius corresponds approximately to the largest eye rotation that can be comfortably sustained for a perceptible length of time. Therefore, providing microlenses outside the outer radius would provide little benefit. In addition, the inner radius of 5 mm allows for clear foveal distance vision. Hence, in this development of the inventive method the microlenses are superimposed on an area of the distance portion which is effective in providing a myopic defocus and still provides some comfort to the wearer which increases acceptance of a progressive addition lens established according to the computer implemented method.

In the inventive method, the microlenses may be superimposed on the surface in form a microlens array covering an array area on the surface where the superimposing is done such that the fraction of the array area which is covered by microlenses is at least 30%. A coverage of at least 30% already provides for a sufficient stop signal to inhibit progression of myopia. Nevertheless, the coverage may be higher, for example at least 40% or at least 50%.

According to a further development of the method the number of microlenses are superimposed such on the surface that they form a microlens array in which each microlens that is not located at the edge of the array has at least four neighbors. The distance between the centers of neighboring microlenses lies in the range between 1.3 mm and 2.0 mm, and each microlens is elliptical with the arithmetic mean of the semi-major axis and the semi-minor axis being in the range between 0.25 mm and 0.75 mm, in particular in the rage between 0.4 mm and 0.65 mm.. Such a microlens array allows for an area coverage ratio, i.e., fraction of the array area which is covered by microlenses, between 30% and 60%, which is effective in providing a stop signal for the development of myopia, while at the same time keeping the discomfort for the wearer tolerable.

The surface on which the microlenses are superimposed according to the inventive method may be the power variation surface. Superimposing the microlenses on the other surface would make them astigmatic over the peripheral areas of the progressive addition lens. Astigmatic imaging of the microlenses would not provide a clear stop signal for the development of myopia to the eye. In fact, it may provide a conflicting signal for emmetropisation depending on the orientation of the edges of any viewed objects, as the location of the focal point of the image varies with the orientation of the cylinder axis.

Providing the progressive addition lens and superimposing the microlenses on that surface of the progressive addition lens may be implemented by using a numerical representation of a progressive addition lens. Then, a mold is fabricated based on the numerical representation of the progressive addition lens, and the progressive addition lens is manufactured by a molding or casting process using that mold. As a further alternative, which does not require a numerical representation of the progressive addition lens, providing the progressive addition lens and superimposing the microlenses on the surface of the progressive addition lens may be done by providing a progressive addition lens without microlenses, applying extra material on the surface of the progressive addition lens, and shaping the extra material to form the microlenses. Adding extra material and shaping the extra material could be done by various means. For example, thermal reflow methods, embossing, microdroplet jetting or MEMS based methods could be used. The use of these methods for forming microlenses is described by W. Yuan. "Fabrication of Microlens Array and Its Application: A Review" in J. Mech. Eng. (2018) 31:16. Therefore, reference is made to this document for further details of thermal reflow methods, embossing, microdroplet jetting and MEMS based methods.

According to a third aspect of the disclosure, a computer program for establishing a numerical representation of a progressive addition lens with simultaneous myopic defocus providing microlenses is defined. The computer program comprises program code with instructions which, when executed by a computer, cause the computer to at least:

Obtain a distance dioptric power adapted to distance vision in the upper portion of the progressive addition lens and a near dioptric power adapted to near vision in the lower portion of the progressive addition lens.

Optimize a surface of a numerically represented working spectacle lens so as to provide at least a distance portion located in an upper section of the progressive addition lens, the distance portion including a distance reference point having the distance dioptric power, a near portion located in a lower section of the progressive addition lens, the near portion including a near reference point having the near dioptric power, and an intermediate corridor extending between the distance portion and the near portion. The near reference point may define the apex of the near portion and delimit this portion in vertical direction.

Superimpose a number of microlenses on a surface of the progressive addition lens.

Establishing the optimized numerically represented working spectacle lens with the superimposed microlenses as the numerical representation of the progressive addition lens.

The instructions further cause the computer to superimpose a number of microlenses such that microlenses are excluded from all areas of the surface which are located below a notional line that extends from the nasal to temporal limits of the progressive addition lens at a vertical coordinate above the near reference point, where the value of the coordinate lies in a range between 1.5 mm and 3 mm. In many cases a value between 1.8 mm and 2.2 mm is appropriate, for example a value of 2 mm.

According to the third aspect of the disclosure also a non-volatile computer readable storage medium with program code stored thereon is provided. The program code comprises instructions for establishing a numerical representation of a progressive addition lens, which, when executed by a computer, cause the computer to at least:

Obtain a distance dioptric power adapted to distance vision in the upper portion of the progressive addition lens and near dioptric power adapted to near vision in the lower portion of the progressive addition lens.

Optimize a surface of a numerically represented working spectacle lens so as to provide at least a distance portion located in an upper section of the progressive addition lens, the distance portion including a distance reference point having the distance dioptric power, a near portion located in a lower section of the progressive addition lens, the near portion including a near reference point having the near dioptric power, and an intermediate corridor extending between the distance portion and the near portion. The near reference point may define the apex of the near portion and delimit this portion in vertical direction.

Superimpose a number of microlenses on a surface of the progressive addition lens.

Establishing the optimized numerically represented working spectacle lens with the superimposed microlenses as the numerical representation of the progressive addition lens.

The program code further comprises instructions that cause the computer to superimpose the number of microlenses such that microlenses are excluded from all areas of the surface which are located below a notional line that extends from nasal to temporal limits of the progressive addition lens at a vertical coordinate above the near reference point, where the value of the coordinate lies in a range between 1.5 mm and 3 mm. In many cases a value between 1.8 mm and 2.2 mm is appropriate, for example a value of 2 mm.

Furthermore, according to the third aspect of the disclosure, also a data processing system for establishing a numerical representation of a progressive addition lens with simultaneous myopic defocus providing microlenses is defined. The data processing system comprises a processor and at least one memory where, by means of instructions of a computer program stored in the memory, the processor is configured to at least:

Obtain a distance dioptric power adapted to distance vision in the upper portion of the progressive addition lens and the near dioptric power adapted to near vision in the lower portion of the progressive addition lens.

Optimize a surface of a numerically represented working spectacle lens so as to provide at least a distance portion located in an upper section of the progressive addition lens, the distance portion including a distance reference point having the distance dioptric power, a near portion located in a lower section of the progressive addition lens, the near portion including a near reference point having the near dioptric power, and an intermediate corridor extending between the distance portion and the near portion. The near reference point may define the apex of the near portion and delimit this portion in vertical direction.

Superimpose a number of microlenses on a surface of the progressive addition lens.

Establish the optimized numerically represented working spectacle lens with the superimposed microlenses as the numerical representation of the progressive addition lens.

By means of the instructions stored in the memory, the processor is further configured to superimpose a number of microlenses such that microlenses are excluded from all areas of the surface which are located below a notional line that extends from nasal to temporal limits of the progressive addition lens at a vertical coordinate above the near reference point, where the value of the coordinate lies in a range between 1.5 mm and 3 mm. In many cases a value between 1.8 mm and 2.2 mm is appropriate, for example a value of 2 mm.

The inventive data processing system allows for performing the inventive computer implemented method and, thus, for establishing a numerical representation of an inventive progressive addition lens, while the inventive computer program and the inventive non-volatile computer readable storage medium allow for transforming a computer into an inventive data processing system. Further developments of the data processing system, the computer program and the non-volatile computer readable storage medium may be such that they allow to perform the further developments of the inventive computer implemented method.

In addition, according to the third aspect of the disclosure, a computer implemented method of establishing a numerical representation of a progressive addition lens with simultaneous myopic defocus providing microlenses is defined. The computer implemented method comprises at least the steps of:

obtaining a distance dioptric power adapted to distance vision in the upper portion of the progressive addition lens, and a near dioptric power adapted to near vision in the lower portion of the progressive addition lens;

optimizing a surface of a numerically represented working spectacle lens so as to provide at least a distance portion located in an upper section of the progressive addition lens, the distance portion including a distance reference point having the distance dioptric power, a near portion located in a lower section of the progressive addition lens, the near portion including a near reference point having the near dioptric power, and an intermediate corridor extending between the distance portion and the near portion;

superimposing a number of microlenses on a surface of the progressive addition lens; and establishing the optimized numerically represented working spectacle lens with the superimposed microlenses as the numerical representation of the progressive addition lens.

The microlenses are superimposed such that microlenses are excluded from all areas of the surface which are located below a notional line that extends from nasal to temporal limits of the spectacle lens at a vertical coordinate above the near reference point where the vertical coordinate lies at a distance above the near reference point (7) with the distance being in a range between 1.5 mm and 3 mm. In many cases a distance between 1.8 mm and 2.2 mm is appropriate, for example a value of 2 mm.

The inventive computer implemented method allows for establishing a numerical representation of an inventive progressive addition lens. Further developments of the computer implemented method may be such that they allow to perform the further developments of the inventive computer implemented method.

BRIEF DESCRIPTION OF THE DRAWINGS

The disclosure will now be described with reference to the drawings wherein.

DESCRIPTION OF EXEMPLARY EMBODIMENTS

Figure 1:
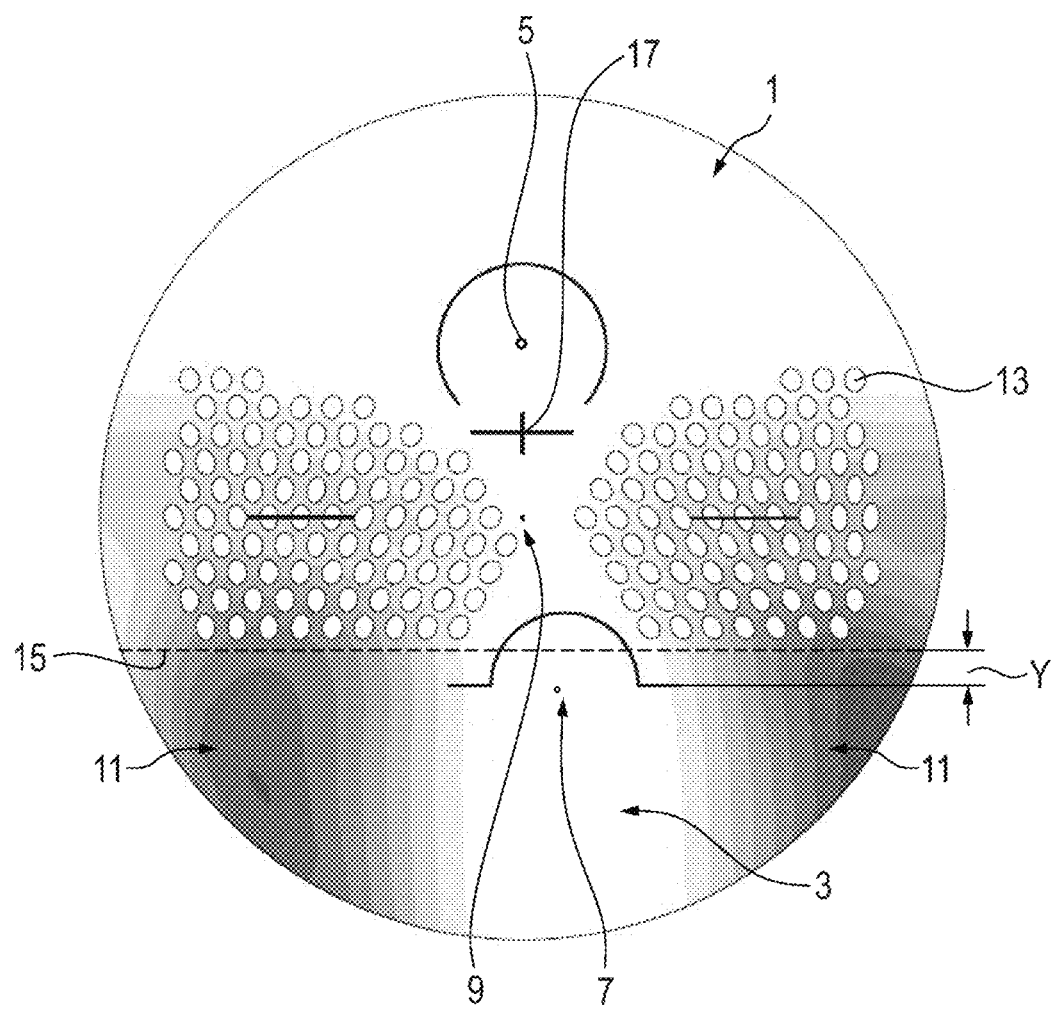
FIG. 1 shows a first exemplary embodiment of a progressive addition lens with microlenses superimposed on a surface thereof.

Various exemplary embodiments of an inventive progressive addition lens will now be described with respect to FIGS. 1 to 4 which show contour plots of the RMS blur of the power variation surface of the progressive addition lens having the first addition power of +1.50 D together with arrays of microlenses having the second addition power of +2.50 D superimposed on the respective power variation surface. The innermost contours represent an RMS blur of 0.25 D with neighboring contours representing an increment in RMS blur of 0.25 D. The contour plots of the exemplary embodiments each represent a 40 mm diameter progressive addition lens.

It should be noted that the contour plots of the RMS blur are based on ray tracing the model progressive addition lens in the material having the refractive index of 1.60 having the base curve of 3.10 D and a spherical back surface of 6.11 D providing the lens power of −3.00 D at the distance reference point, zero prism at the prism reference point and the center thickness of 1.5 mm; located in front of the eye at a 27 mm back vertex distance from the center of rotation of the eye in an as worn configuration tilted pantoscopically by 7 degrees. The assumed object field of the ray trace has a vertically varying distance starting at infinity (the dioptric distance of 0.00 D) for all rays crossing the front lens surface at elevations above the fitting cross (FC), through a linearly increasing dioptric object distance below the FC up to the near vision reference point, where the object distance was 0.40 m (dioptric object distance of 2.50 D). In addition, for the calculation of RMS blur it was assumed the wearer could accommodate up to 1.00 D of power error.

In the exemplary embodiments, power variation surfaces each provide a designated distance portion 1 in the upper part of the progressive addition lens and a designated near portion 3 in the lower part of the progressive addition lens. The distance portion 1 includes a distance reference point 5 which provides for a wearer a distance dioptric power according to a prescription. Likewise, the near portion 3 includes a near reference point 7 which provides an addition power for reducing accommodative lag while viewing near objects. Between the distance portion 1 and the near portion 3 extends an intermediate corridor 9 in which the dioptric power provided by the progressive addition lens gradually increases from the distance dioptric power to the near dioptric power. Typically, the near reference point 7 is located between 6 and 12 mm below the geometric center of the spectacle lens, in particular between 7 and 10 mm below the geometric center of the spectacle lens, and may be shifted in nasal or temporal direction with respect to the geometric center. In the present exemplary embodiment the near reference point 7 is located 8 mm below the geometric center of the circular uncut progressive addition lens.

In the exemplary embodiments, the near dioptric power is the power that results from the distance dioptric power plus an addition power which is, like the distance dioptric power, given in a prescription. In all exemplary embodiments this addition power is 1.50 D, and the length of the intermediate corridor is 12 mm. To the left and to the right of the near portion there are peripheral zones 11 in which the mean addition power does not exceed 0.125 D. The separation between these zones to the left and to the right of the near portion is 25 mm or less and may in particular, be 20 mm or less. As a consequence, the power variation surface provides large gradients of the mean addition power in the areas adjoining near portion to the left and to the right. Such power variation surfaces are described in WO 2018/100012 A1. It is, therefore, referred to this document for further details about the power variation surface.

To provide a simultaneous myopic defocus, microlenses 13 are superimposed on the power variation surfaces of the progressive addition lenses. In all exemplary embodiments the power variation surface is the front surface of the respective progressive addition lens. However, in principle, the power variation surface may be the rear surface of the respective progressive addition lens instead of the front surface. In such a case the microlenses would need to be applied also to the back surface and they will need to have less concave shapes relative to the underlying concave back surface.

In the exemplary embodiments, the microlenses 13 are superimposed on the power variation surface in a form of a hexagonal grid of microlenses in which each microlens 13 has six nearest neighbors, except for microlenses 13 which are located at the edge of the array. The distances between the nearest neighbors, as measured from the geometrical center of the microlenses 13, are constant, with a value in the range between 1.3 mm to 2.0 mm. As a consequence, the microlenses 13 are arranged in a hexagonal pattern. However, in alternative embodiments of the disclosure the locations of the microlenses 13 could as well form a rectangular pattern, in particular a quadratic pattern, which would mean that each microlens 13 which is not located at the edge of the array has only 4 nearest neighbors.

In the present exemplary embodiment, each microlens 13 provides a second addition power that is 1.0 D higher than the addition power at the near reference point 7 (which may be referred to as a first addition power in the context of the present specification). In the exemplary embodiments the first addition power at the near reference point 7 is 1.50 D, and each microlens 13 provides a second addition power of 2.50 D.

The areas of the surface in which the microlenses 13 are present, may be covered by the microlenses by a fraction between 30% and 50%. With the distances between neighboring microlenses 13 as stated above, this can be achieved if elliptical microlenses are used in which the arithmetic mean of the semi-major axis and the semi-minor axis are in the range between 0.25 mm and 0.75 mm. Please note that an elliptical microlens would be a circular microlens if the semi-major axis and the semi-minor axis have identical dimensions. In the context of the present specification such circular microlenses shall be considered as a special case of elliptical microlenses.

The exemplary embodiments shown in FIGS. 1 to 4 differ from each other in the area of the respective progressive addition lens that is covered by the microlenses 13 and in the coverage ratio that is provided by the respective arrays of microlenses 13 in these areas. However, all of the exemplary embodiments have in common that microlenses are excluded from all areas of the power variation surface which are located below a notional line 15 that extends from the nasal to temporal limits of a progressive addition lens and is located at a vertical coordinate y=2 mm above the near reference point 7, i.e., a coordinate y at a distance of 2 mm above the near reference point 7. The contour plots shown in FIGS. 1 to 4 are oriented such that the notional line 15 is represented by a horizontal line. In addition, in the exemplary embodiments shown in FIGS. 1 and 3, the microlenses 13 are only present in areas in which the ray traced RMS blur exceeds a threshold of 0.25 D. In the context of the present specification, the RMS blur shall be considered to be the physiological blur a wearer of the progressive addition lens experiences due to the squared mean spherical error (SphErr) and the squared mean astigmatic error (AstErr) added together with appropriate weights A, B to reflect the way the human vision integrates such optical errors. One example for calculating the RMS blur is RMS=Sqrt (SphErr$^2$+(AstErr/2)$^2$) with the weights being 1 and ½, respectively. However, in other examples the weights may each have a value taken from the range between 0 and 1.

In the exemplary embodiment shown in FIG. 1, arrays of microlenses 13 are located substantially to the left and the right of the intermediate corridor 9. The near portion 3 is completely free of microlenses 13 because it is fully located below the notional line 15. All microlenses 13 are elliptical with their semi-major axis and their semi-minor axis having dimensions between 0.25 mm and 0.75 mm. While some of the microlenses 13 have a distinct elliptical shape, others have a more circular shape, in particular those located at the upper ends of the arrays. The distance between the centers of neighboring microlenses 13 is 1.5 mm in the present exemplary embodiment, which leads to a coverage ratio of about 42%.

Figure 2:
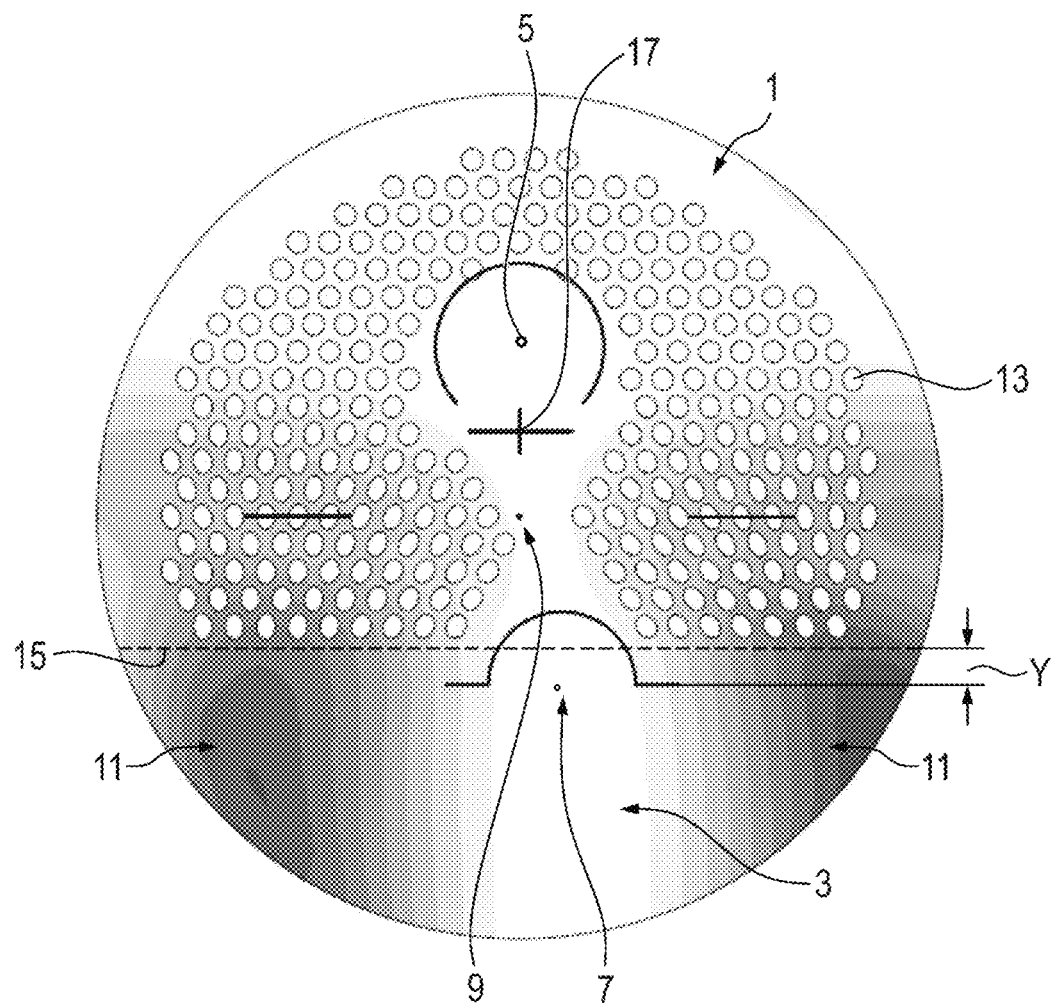
FIG. 2 shows a second exemplary embodiment of a progressive addition lens with microlenses superimposed on a surface thereof.

The exemplary embodiment of the progressive addition lens shown in FIG. 2 is a modification of the exemplary embodiment shown in FIG. 1. The exemplary embodiment shown in FIG. 2 differs from the exemplary embodiment shown in FIG. 1 in that the array of microlenses 13 is also present in parts of the distance portion 1, in which the RMS blur is below a threshold of 0.25 D. The array of the microlenses 13 in the distance portion 1 forms a semi-annulus centered on the fitting cross 17, where the inner radius of the semi-annulus is 5 mm while the outer radius of the semi-annulus is 17.5 mm. In addition, microlenses have been excluded from the measurement circle to enable easy verification of the lens power by an optical dispenser. As can be seen from FIG. 2 the microlenses 13 in the distance portion 1 are more circular than the microlenses 13 located to the left and to the right of the intermediate corridor 9. The reason is that the amount of surface astigmatism in the distance portion 1 is less than the amount of surface astigmatism in the areas to the left and to the right of the intermediate corridor 9. The higher the surface astigmatism is, the more elliptical are the microlenses 13. The greater coverage of the surface of the lens by microlenses around the fitting cross will expose the wearer to more frequent simultaneous myopic defocus and will facilitate a proper centration of distance vision on the fitting cross. The frame slippage is often an issue for the young Asian wearers due to their flat noses, and this inhibits the proper use of the PAL near zone to view close objects, because the near reference point is too far down, if the frame has slipped down the nose from its intended position.

Figure 3:
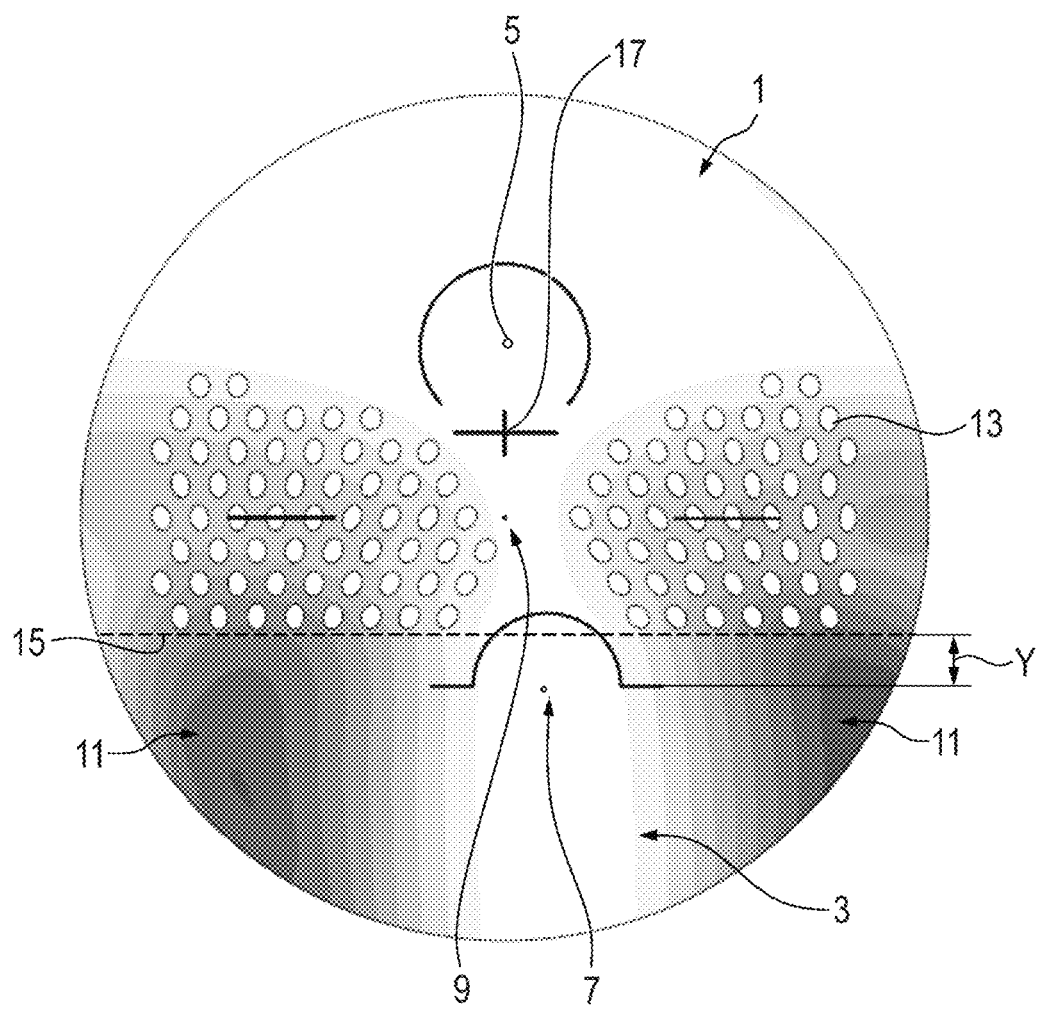
FIG. 3 shows a third exemplary embodiment of a progressive addition lens with microlenses superimposed on a surface thereof.

A third exemplary embodiment of the inventive progressive addition lens is shown in FIG. 3. This exemplary embodiment differs from the exemplary embodiment shown in FIG. 1 in that the distance between the centers of neighboring microlenses 13 is 1.8 mm instead of 1.5 mm, which results in a coverage ratio of the area covered by the microlenses 13 of 30%. In all other respects, the exemplary embodiment shown in FIG. 3 does not differ from the exemplary embodiment shown in FIG. 1.

Figure 4:
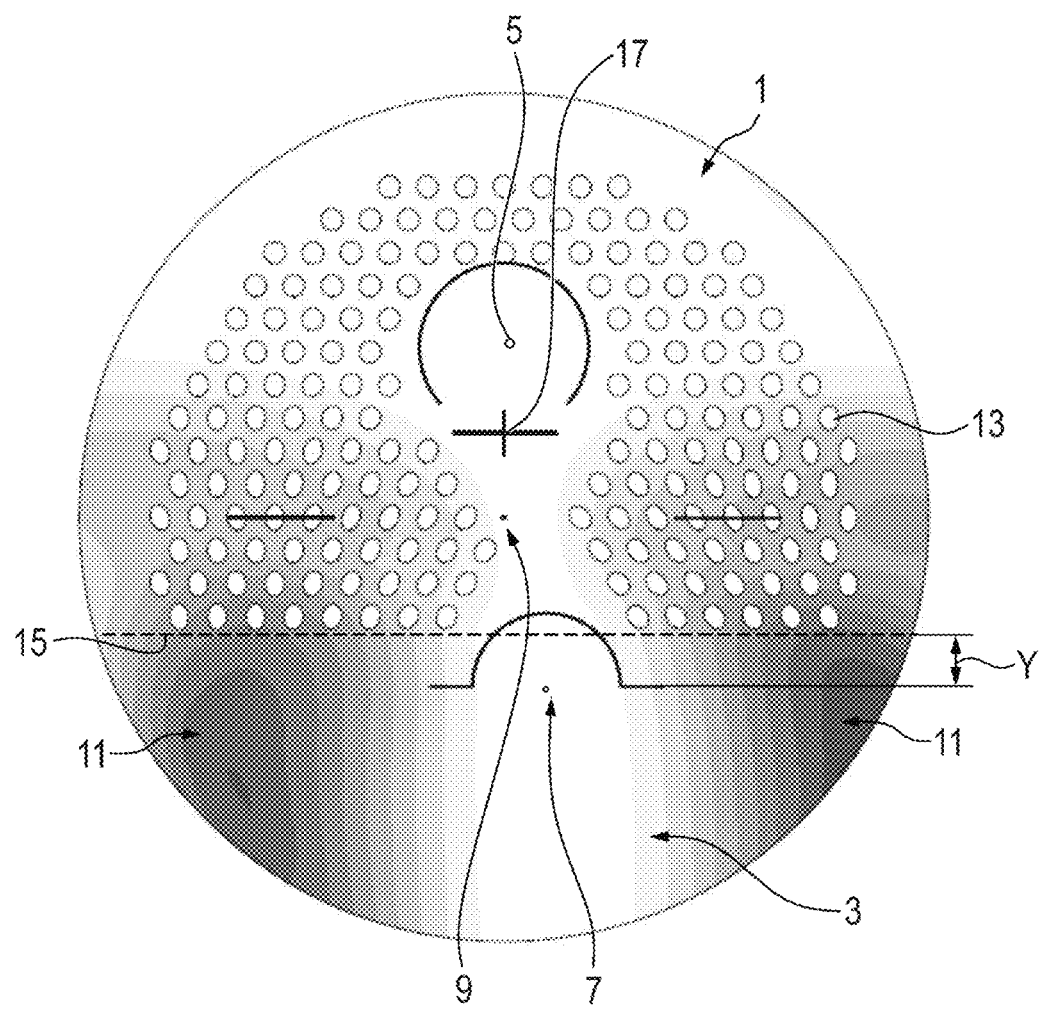
FIG. 4 shows a fourth exemplary embodiment of a progressive addition lens with microlenses superimposed on a surface thereof.

A fourth exemplary embodiment of the inventive progressive addition lens is shown in FIG. 4. This exemplary embodiment is similar to the exemplary embodiment shown in FIG. 2. It differs from the embodiment shown in FIG. 2 in that the distance between neighboring microlenses 13 is 1.8 mm instead of 1.5 mm, which results in a coverage ratio of the area covered by the microlenses 13 of 30%. In all other respects the exemplary embodiment shown in FIG. 4 does not differ from the exemplary embodiment shown in FIG. 2.

Figure 5:
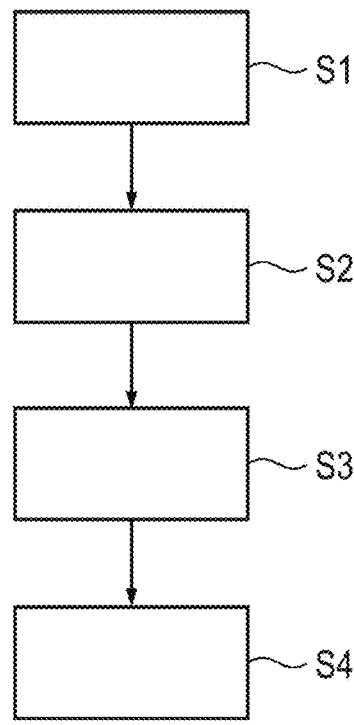
FIG. 5 shows an exemplary embodiment of a computer implemented method of establishing a numerical representation of a progressive addition lens with microlenses superimposed on a surface thereof.

Next, an exemplary embodiment for the inventive computer implemented method will be described with respect to FIG. 5 which shows a flow chart representing steps of the method. In the present exemplary embodiment, the method is executed on a computer which has been transformed into a data processing system for establishing a numerical representation of a progressive addition lens by means of a computer program with program code including instructions which, when executed by the computer, cause it to perform the computer implemented method. Such a computer program may be loaded into the memory of the computer from a non-volatile storage medium. The instructions of the computer program loaded into the memory can then be executed by the processor of the computer in order to perform the method of establishing a numerical representation of a progressive addition lens.

In a first step after starting the method, the distance dioptric power and the addition power prescribed for the wearer are loaded into the computer. Please note that the distance dioptric power and the addition power allow for obtaining the near dioptric power of the wearer. In addition, a target design is also loaded in step S1. In case of astigmatism, strabismus or any other optical aberration of the wearer, further data may be loaded into the computer in step S1. For example, values for cylinder and cylinder axis or a value for prism may be loaded. However, in the description of the present exemplary embodiment those further aberrations are disregarded because they are not necessary for comprehending the described method.

Based on the distance reference power, the addition power and the target design loaded in step S1, the front surface of a numerically represented working spectacle lens is optimized. Although, in the present embodiment, the front surface of the working spectacle lens is optimized, it is also possible to optimize the rear surface of the working spectacle lens. The optimization is done by iteratively optimizing parameters of the parameterized piecewise defined functions by which the front surface is represented. In each step of the iteration the current back focal lengths of a number of pencils of rays passing through the working spectacle lens are calculated by means of a ray tracing process based on the refractive index of the chosen material, the current curvature of the front surface of the working spectacle lens, as defined by the current set of parameters of the piecewise defined functions, the curvature of the rear surface, the thickness of the working spectacle lens, and the object distances from where the pencils of rays emerge. The pencils of rays represent different viewing directions of the eye through the working spectacle lens. In the calculation of the current back focal lengths for the pencils of rays, the position of the progressive addition lens before the eye according to the as-worn position is also taken into account. In addition to the current back focal lengths of the pencils of rays, the deviations of the calculated current back focal lengths from the back focal length resulting from the prescription are determined. Then, the differences between the calculated deviations and the deviations given by the target design are determined. The differences are weighted and summed up in a global merit function. Optionally, the merit function may also include non-optical deviations from target values, for example, deviations from wanted curvatures of the surface or from a wanted thickness of the progressive addition lens.

After the value of the merit function has been calculated, it is checked whether the calculated value represents a minimum. In case of yes, the iteration is finished and the method proceeds to step S3; in case of no, the next iteration step is performed.

After the optimization is finished, an array of microlenses is superimposed on the power variation surface of the numerical representation of the working spectacle lens in step S3. Each of the microlenses provides a second addition power that is, in the present exemplary embodiment, at least equal to or higher than the addition power added to the distance dioptric power to obtain the near dioptric power. The microlenses are elliptical, and the degree of ellipticity is determined by the surface astigmatism of the underlying surface. The distance between the microlenses is set such, that a desired coverage ratio of the area covered by the microlenses is achieved.

After superimposing the array of microlenses on the power variation surface, the resulting surface is output as the numerical representation of the desired progressive addition lens in step S4.

Figure 6:
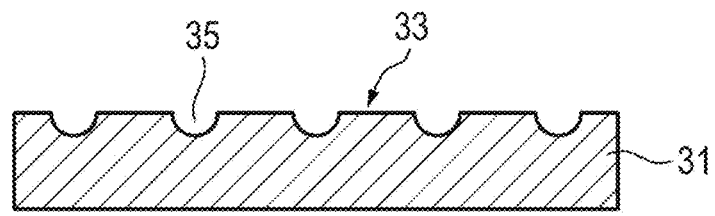
FIG. 6 shows a part of a mold for molding a progressive addition lens with microlenses.
Figure 7:
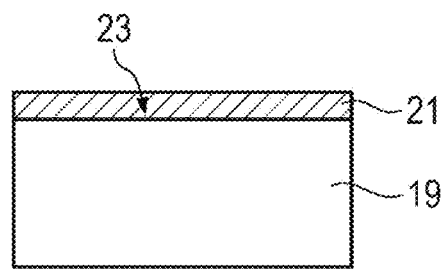
FIG. 7 shows the application of layer of extra material in a manufacturing process for manufacturing a progressive addition lens with microlenses.

Based on the numerical representation of the progressive addition lens a corresponding physical progressive addition lens can be manufactured by use of a suitable manufacturing process. For example, based on the numerical representation of the progressive addition lens a mold 31 can be formed, which is then used for injection molding of a thermoplastic material. A part of a mold 31 for molding a progressive addition lens with microlenses is schematically shown in FIG. 6. The part shown in FIG. 6 is the part used for forming the surface with the microlenses, which is, in the present exemplary embodiment, the power variation surface. It provides a mold surface 33 that has the inverted shape of the power variation surface to be produced. In this mold surface 33, indentations 35 are present which have the inverted shapes of the microlenses to be formed.

An alternative way of manufacturing progressive addition lenses exemplified above is to provide a progressive addition lens without microlenses and to apply extra material on a surface of the progressive addition lens, in particular on the power variation side. This extra material can be shaped to form the microlenses 13. Applying and shaping can be done in a single step, e.g. by microdroplet jetting, where the surface tension of the microdroplets provides for the shape of the microlenses, or in successive steps. As an exemplary embodiment for a method of manufacturing in which applying and shaping is done in successive steps, a thermal reflow method will be described with reference to FIGS. 7 to 10, which show different states of the progressive addition lens during the manufacturing process in a schematic fashion.

Figure 8:
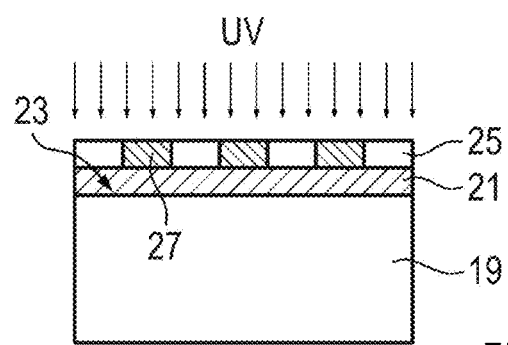
FIG. 8 shows the exposition of a masked layer of photoresist material to ultraviolet light.
Figure 9:
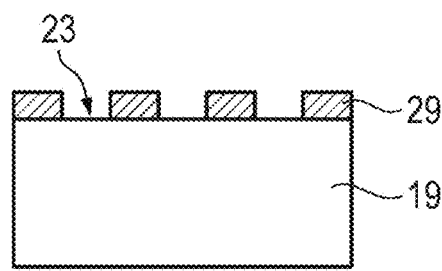
FIG. 9 shows the progressive addition layer after exposure to ultraviolet light.
Figure 10:
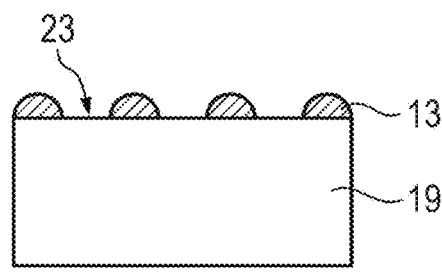
FIG. 10 shows the performance of a heat treatment.

At the beginning of the method, a progressive addition lens 19 without microlenses 13 is provided. This progressive addition lens 19 may be manufactured according to any known method of manufacturing progressive addition lenses. Next, a layer 21 of extra material is applied on a surface of the progressive addition lens 19, in particular on the power variation surface 23 (see FIG. 7). As the extra material, a photo resist material is used. Then, a mask 25 with elliptical structures 27 is applied on the layer 21 of photo resist material. The elliptical structures 27 cover those areas of the surface of the extra layer 21 where the microlenses 13 are to be formed. Then the masked layer 21 of photoresist material is exposed to ultraviolet light 27, as is shown in FIG. 8. The exposure removes the photo resist material of the extra layer 21 where it is not covered by the elliptical structures 27 of the mask 25 to leave cylindrical islands 29 of photo resist material on the surface 23 (see FIG. 9). In a next step, the structure is subjected to a heat treatment, which causes the photo resist material of the cylindrical islands 29 to become viscous, so that the material of the cylindrical islands 29 flows into the spherical shape of the microlenses 13. The resulting progressive addition lens 19 with microlenses 13 is shown in FIG. 10.

Although a thermal reflow method has been described as an exemplary embodiment of a manufacturing method in which applying and shaping is done in successive steps, other methods, like for example embossing methods, are also possible.

The present disclosure has been described with reference to exemplary embodiments thereof for reasons of illustration. However, a person skilled in the art recognizes that deviations from the exemplary embodiments within the scope of the present disclosure are possible. For example, coverage ratios other than 30% or 42% are possible, for example 40% or 60%, as long as the coverage ratio is at least 30%. In addition, the progressive addition lens can have other addition powers than 1.50 D. Likewise, the second addition power provided by the microlenses may differ from the 2.50 D described in the exemplary embodiments, as long as it is at least as large as the addition power used for obtaining the near dioptric power. Also, the vertical coordinate above the near reference point at which the notional line that extends from nasal to temporal limits of the progressive addition lens has been chosen to have a distance of 2 mm from the near reference point. However, in alternative embodiments the distance by which the vertical coordinate lies above the near reference point could be any value out of the range between 1.5 mm and 3 mm. Therefore, the present disclosure shall not be delimited by the exemplary embodiments but only by the independent claims.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail prevail.

REFERENCE NUMERALS 1 distance portion
3 near portion
5 distance reference point
7 near reference point
9 intermediate corridor
11 zones with the mean addition power at or below 0.125 D
13 microlens
15 notional line
17 fitting cross
19 progressive addition lens
21 layer of extra material
23 power variation surface
25 mask
27 elliptical structures
29 islands
31 mold
S1 loading
S2 optimizing
S3 superimposing microlenses
S4 outputting numerical representation of progressive addition lens.

The invention claimed is:

1. A progressive addition lens having microlenses for providing simultaneous myopic defocus, the progressive addition lens comprising:
   a power variation surface being configured to provide at least:
      a designated distance portion located in an upper section of the progressive addition lens being configured for distance vision;
      a designated near portion located in a lower section of the progressive addition lens, the near portion including a near reference point having a near dioptric power configured for near vision; and
      a designated intermediate corridor extending between the designated distance portion and the designated near portion; and
   a plurality of microlenses superimposed on a surface of the progressive addition lens,
      wherein the microlenses are excluded from all areas of the surface which are located below a notional line that extends from nasal to temporal limits of the progressive addition lens at a vertical coordinate above the near reference point, and
      wherein the vertical coordinate lies at a distance above the near reference point with the distance being in a range between 1.5 mm and 3 mm.

2. The progressive addition lens, as claimed in claim 1, wherein the progressive addition lens is a circular uncut progressive addition lens.

3. The progressive addition lens as claimed in claim 1, further comprising:
   peripheral zones arranged to a left and to a right of the designated near portion, peripheral zones having a mean addition power that does not exceed 0.125 D, wherein a separation between the peripheral zones to the left and to the right of the near portion is 25 mm or less.

4. The progressive addition lens as claimed in claim 1, wherein in portions of the progressive addition lens from which microlenses are not excluded, the microlenses are present at least in zones of the surface in which an RMS blur exceeds a threshold of 0.25 D.

5. The progressive addition lens as claimed in claim 4, wherein the RMS blur is a physiological blur experienced by a wearer of the progressive addition lens given by the formula:

$$RMS = Sqrt((A \cdot SphErr)^2 + (B \cdot AstErr)^2),$$

wherein SphErr is a mean spherical error, AstErr is a mean astigmatic error, and A and B are weights having values in a range from ½ to 1.

6. The progressive addition lens as claimed in claim 1, wherein
   the distance portion includes a distance reference point having a distance dioptric power;
   the near dioptric power at the near reference point is given by the distance dioptric power plus a first addition power; and
   each microlens provides a second addition power at least as high as the first addition power.

7. The progressive addition lens as claimed in claim 6, wherein a fitting cross is provided on the progressive addition lens and the microlenses are distributed over an area of the distance portion which forms a semi-annulus with a smaller radius between 4 and 6 mm and a larger radius between 17 mm and 18 mm, and wherein an area around the distance reference point having at least a radius of 4 mm is free of microlenses.

8. The progressive addition lens as claimed in claim 1, wherein the microlenses superimposed on the surface form a microlens array covering an area of the surface, and wherein a fraction of the area of the surface which is covered by microlenses is at least 30%.

9. The progressive addition lens as claimed in claim 1, wherein the microlenses superimposed on the surface form a microlens array in which:
   each microlens that is not located at an edge of the microlens array has at least four neighbors,
   a distance between centers of neighboring microlenses lies in a range between 1.3 mm and 2.0 mm, and
   each microlens is elliptical with an arithmetic mean of a semi-major axis and a semi-minor axis being in a range between 0.25 mm and 0.75 mm.

10. The progressive addition lens as claimed in claim 1, wherein the surface on which the microlenses are superimposed is the power variation surface.

11. A method of manufacturing a progressive addition lens having microlenses for providing simultaneous myopic defocus, the method comprising:
   providing a progressive addition lens with a power variation surface, wherein the power variation surface provides at least a designated distance portion located in an upper section of the progressive addition lens being configured for distance vision, a designated near portion located in a lower section of the progressive addition lens, the near portion including a near reference point having a near dioptric power configured for near vision, and a designated intermediate corridor extending between the designated distance portion and the designated near portion; and
   superimposing a plurality of microlenses on a surface of the progressive addition lens; and
   excluding, when superimposing the plurality of microlenses, a superimposition of microlenses from all areas of the surface which are located below a notional line that extends from nasal to temporal limits of the progressive addition lens at a vertical coordinate above the near reference point,
   wherein the vertical coordinate lies at a distance above the near reference point with the distance being in a range between 1.5 mm and 3 mm.

12. The method as claimed in claim 11, wherein a circular uncut progressive addition lens is manufactured.

13. The method as claimed in claim 11, wherein as the progressive addition lens a progressive addition lens with peripheral zones to a left and to a right of the designated near portion, in which a mean addition power does not exceed 0.125 D and with a separation between the peripheral zones to the left and to the right of the near portion of 25 mm or less, is provided.

14. The method as claimed in claim 11, wherein the plurality of microlenses is superimposed on the surface of the progressive addition lens such that in portions of the progressive addition lens where microlenses are not excluded, the microlenses are present in areas of the surface of the progressive addition lens where an RMS blur exceeds a threshold of 0.25 D.

15. The method as claimed in claim 11, wherein the distance portion comprises a distance reference point providing a distance dioptric power in addition to the near portion where the near dioptric power at the near reference point is given by the distance dioptric power plus a first addition power, and each of the superimposed microlenses provides a second addition power at least as high as the first addition power.

16. The method as claimed in claim 15, wherein a fitting cross is provided on the spectacle lens, wherein, when the microlenses are superimposed on the surface, the microlenses are distributed over an area of the distance portion which forms a semi-annulus with a smaller radius between 4 and 6 mm and a larger radius between 17 mm and 18 mm, and wherein an area around the distance reference point having at least a radius of 4 mm is free of microlenses.

17. The method as claimed in claim 11, wherein the microlenses are superimposed on the surface in a form of a microlens array covering an area of the surface and wherein the superimposing is performed such that a fraction of the area which is covered by microlenses is at least 30%.

18. The method as claimed in claim 11, wherein the plurality of microlenses is superimposed on the surface in form of a microlens array in which:
   each microlens that is not located at an edge of the array has at least four neighbors,
   a distance between centers of neighboring microlenses lies in a range between 1.3 mm and 2.0 mm, and
   each microlens is elliptical with an arithmetic mean of a semi-major axis and a semi-minor axis being in the range between 0.25 mm and 0.75 mm.

19. The method as claimed in claim 11, wherein the microlenses are superimposed on the power variation surface.

20. The method as claimed in claim 11, further comprising:
   providing the progressive addition lens and superimposing the microlenses on the surface of the progressive addition lens for a numerical representation of the progressive addition lens;
   fabricating a mold based on the numerical representation of the progressive addition lens; and
   manufacturing the progressive addition lens by molding or casting with the mold.

21. The method as claimed in claim 11, wherein providing the progressive addition lens and superimposing the microlenses on the surface of the progressive addition lens is performed by:
   providing a progressive addition lens without microlenses;
   applying extra material on the surface of the progressive addition lens without microlenses; and
   shaping the extra material to form the microlenses.

22. A computer program for establishing a numerical representation of a progressive addition lens having microlenses for providing simultaneous myopic defocus, the computer program comprising program code with instructions which, when executed by a computer, cause the computer to at least:

obtain a distance dioptric power configured for distance vision in an upper section of the progressive addition lens, and a near dioptric power adapted to near vision in a lower section of the progressive addition lens;

optimize a surface of a numerically represented working spectacle lens so as to provide at least a distance portion located in the upper section of the progressive addition lens, the distance portion including a distance reference point having the distance dioptric power, a near portion located in the lower section of the progressive addition lens, the near portion including a near reference point having the near dioptric power, and an intermediate corridor extending between the distance portion and the near portion;

superimpose a plurality of microlenses on the surface of the progressive addition lens;

establish the optimized numerically represented working spectacle lens with the superimposed microlenses as the numerical representation of the progressive addition lens; and, when superimposing the plurality of microlenses, exclude microlenses from all areas of the surface which are located below a notional line that extends from nasal to temporal limits of the spectacle lens at a vertical coordinate above the near reference point, wherein the vertical coordinate lies at a distance above the near reference point with the distance being in a range between 1.5 mm and 3 mm.

23. The computer program as claimed in claim 22, wherein a numerical representation of a circular uncut progressive addition lens is established.

24. A non-volatile computer readable storage medium with program code stored thereon, the program code comprising instructions for establishing a numerical representation of a progressive addition lens having microlenses for providing simultaneous myopic defocus, the instructions, when executed by a computer, cause the computer to at least:

obtain a distance dioptric power configured for distance vision in an upper section of the progressive addition lens, and a near dioptric power adapted to near vision in a lower section of the progressive addition lens;

optimize a surface of a numerically represented working spectacle lens so as to provide at least a distance portion located in the upper section of the progressive addition lens, the distance portion including a distance reference point having the distance dioptric power, a near portion located in the lower section of the progressive addition lens, the near portion including a near reference point having the near dioptric power, and an intermediate corridor extending between the distance portion and the near portion;

superimpose a plurality of microlenses on the surface of the progressive addition lens;

establish the optimized numerically represented working spectacle lens with the superimposed microlenses as the numerical representation of the progressive addition lens; and, when superimposing the plurality of microlenses, exclude microlenses from all areas of the surface which are located below a notional line that extends from nasal to temporal limits of the spectacle lens at a vertical coordinate above the near reference point, wherein the vertical coordinate lies at a distance above the near reference point with the distance being in a range between 1.5 mm and 3 mm.

25. The non-volatile computer readable storage medium as claimed in claim 24, wherein the program code stored thereon comprises instructions for establishing a numerical representation of a circular uncut progressive addition lens.

26. A data processing system for establishing a numerical representation of a progressive addition lens having microlenses for providing simultaneous myopic defocus, the data processing system comprising a processor and at least one memory where, based on instructions of a computer program stored in the memory, the processor is configured to at least:

obtain a distance dioptric power configured for distance vision in an upper section of the progressive addition lens, and a near dioptric power adapted to near vision in a lower section of the progressive addition lens;

optimize a surface of a numerically represented working spectacle lens so as to provide at least a distance portion located in the upper section of the progressive addition lens, the distance portion including a distance reference point having the distance dioptric power, a near portion located in the lower section of the progressive addition lens, the near portion including a near reference point having the near dioptric power, and an intermediate corridor extending between the distance portion and the near portion;

superimpose a plurality of microlenses on the surface of the progressive addition lens;

establish the optimized numerically represented working spectacle lens with the superimposed microlenses as the numerical representation of the progressive addition lens; and, when superimposing the plurality of microlenses, exclude microlenses from all areas of the surface which are located below a notional line that extends from nasal to temporal limits of the spectacle lens at a vertical coordinate above the near reference point, wherein the vertical coordinate lies at a distance above the near reference point with the distance being in a range between 1.5 mm and 3 mm.

27. The data processing system as claimed in claim 26, wherein, based on the instructions of the computer program stored in the memory, the processor is configured to establish a numerical representation of a circular uncut progressive addition lens.

28. A computer implemented method of establishing a numerical representation of a progressive addition lens having microlenses for providing simultaneous myopic defocus, the method comprising:

obtaining a distance dioptric power configured for distance vision in an upper section of the progressive addition lens, and a near dioptric power adapted to near vision in a lower section of the progressive addition lens;

optimizing a surface of a numerically represented working spectacle lens so as to provide at least a distance portion located in the upper section of the progressive addition lens, the distance portion including a distance reference point having the distance dioptric power, a near portion located in the lower section of the progressive addition lens, the near portion including a near reference point having the near dioptric power, and an intermediate corridor extending between the distance portion and the near portion;

superimposing a plurality of microlenses on the surface of the progressive addition lens;

establishing the optimized numerically represented working spectacle lens with the superimposed microlenses as the numerical representation of the progressive addition lens; and, when superimposing the plurality of microlenses, excluding microlenses from all areas of the surface which are located below a notional line that extends from nasal to temporal limits of the spectacle lens at a vertical coordinate above the near reference point, wherein the vertical coordinate lies at a distance above the near reference point with the distance being in a range between 1.5 mm and 3 mm.

29. The computer implemented method as claimed in claim 28, wherein a numerical representation of a circular uncut progressive addition lens is established.

\* \* \* \* \*